Jan. 12, 1932.　　　　　J. D. BELL　　　　　1,841,002
DRESSING TENT FOR VEHICLES
Filed Oct. 10, 1927　　　4 Sheets-Sheet 1
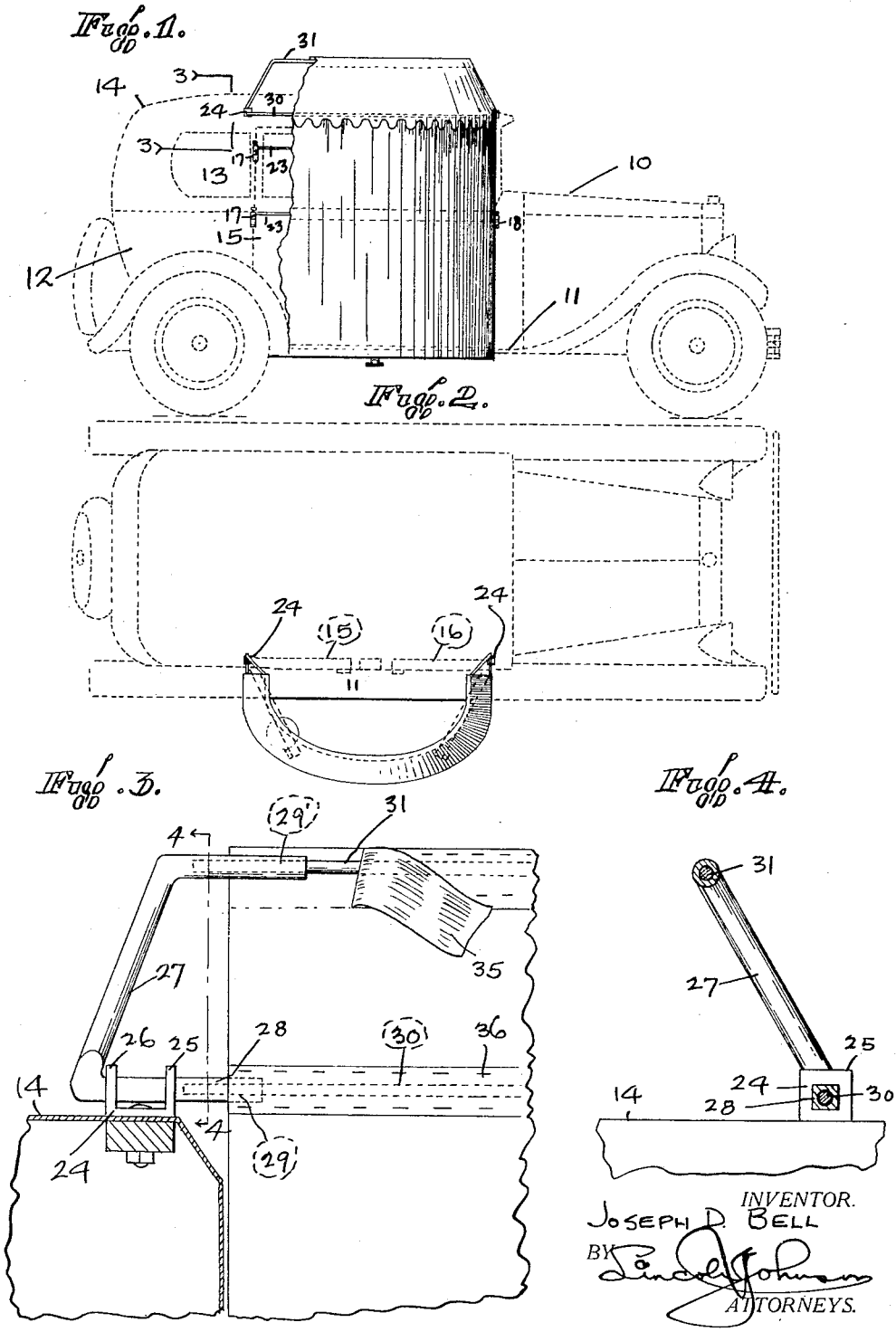

Jan. 12, 1932.  J. D. BELL  1,841,002
DRESSING TENT FOR VEHICLES
Filed Oct. 10, 1927  4 Sheets-Sheet 2
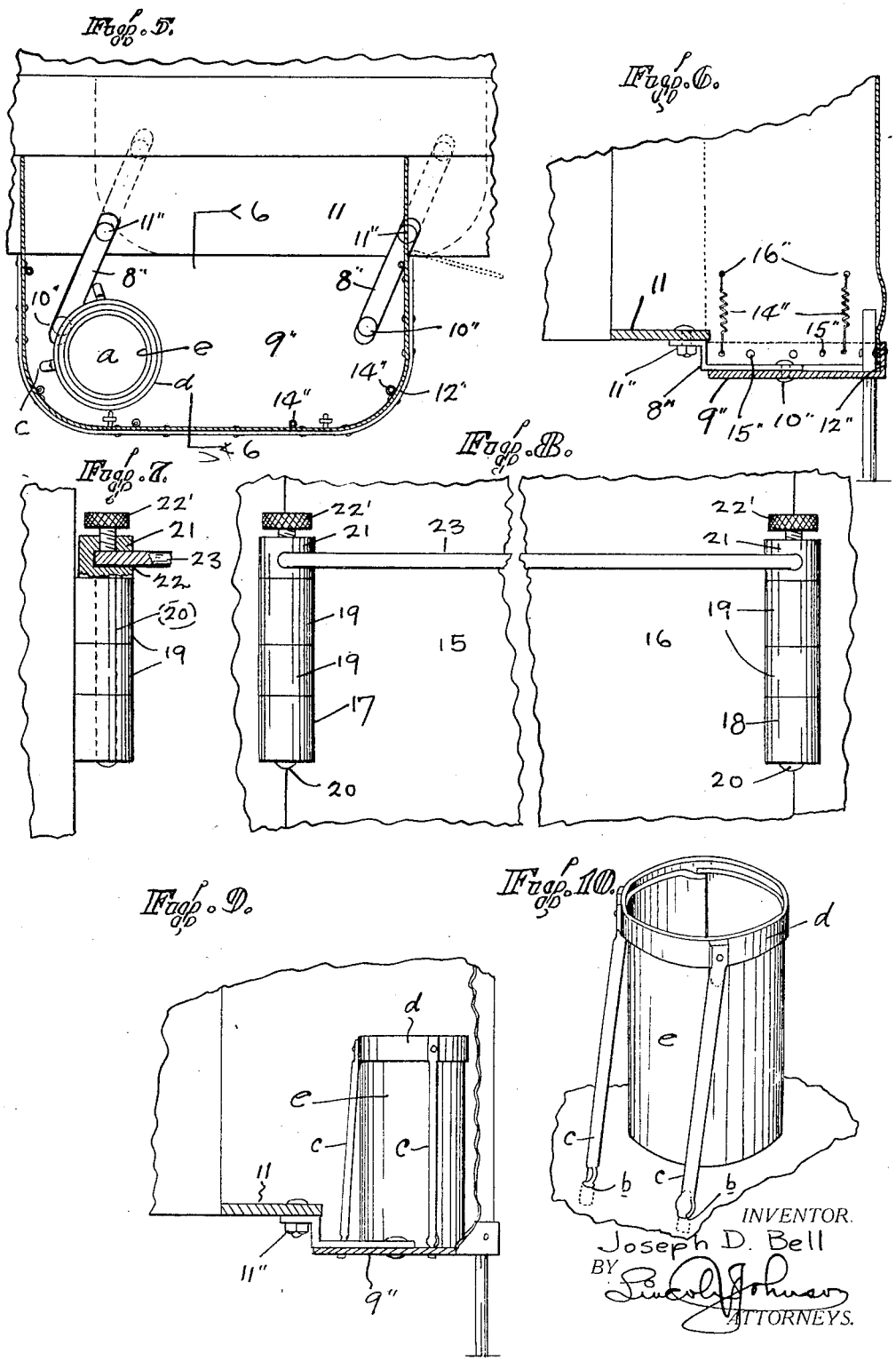

Jan. 12, 1932.   J. D. BELL   1,841,002
DRESSING TENT FOR VEHICLES
Filed Oct. 10, 1927   4 Sheets-Sheet 3
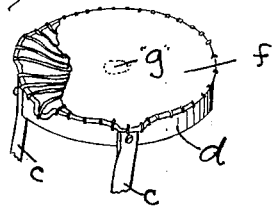
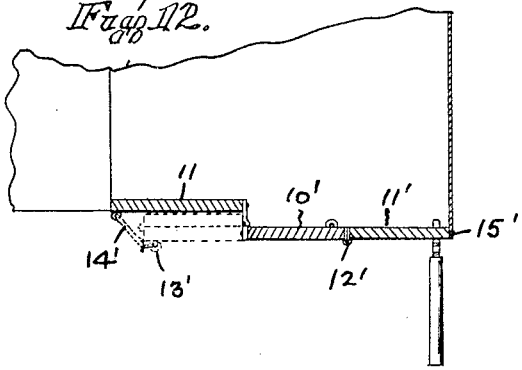
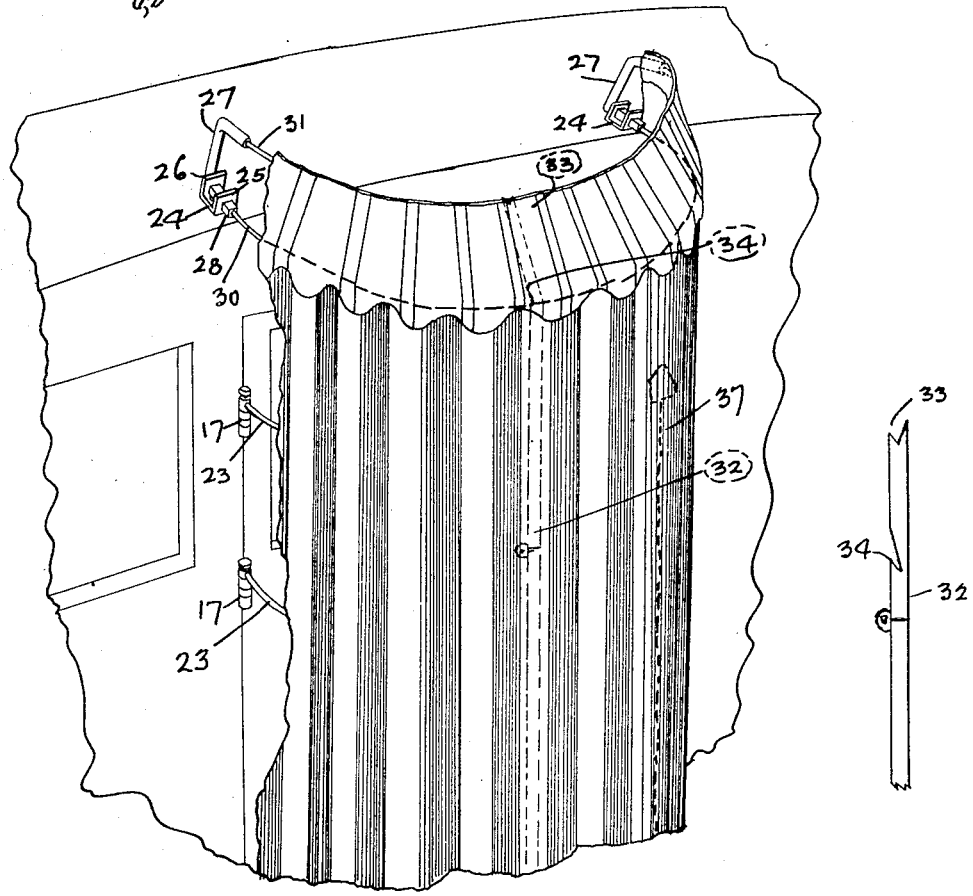
INVENTOR.
JOSEPH D. BELL
BY
ATTORNEYS.

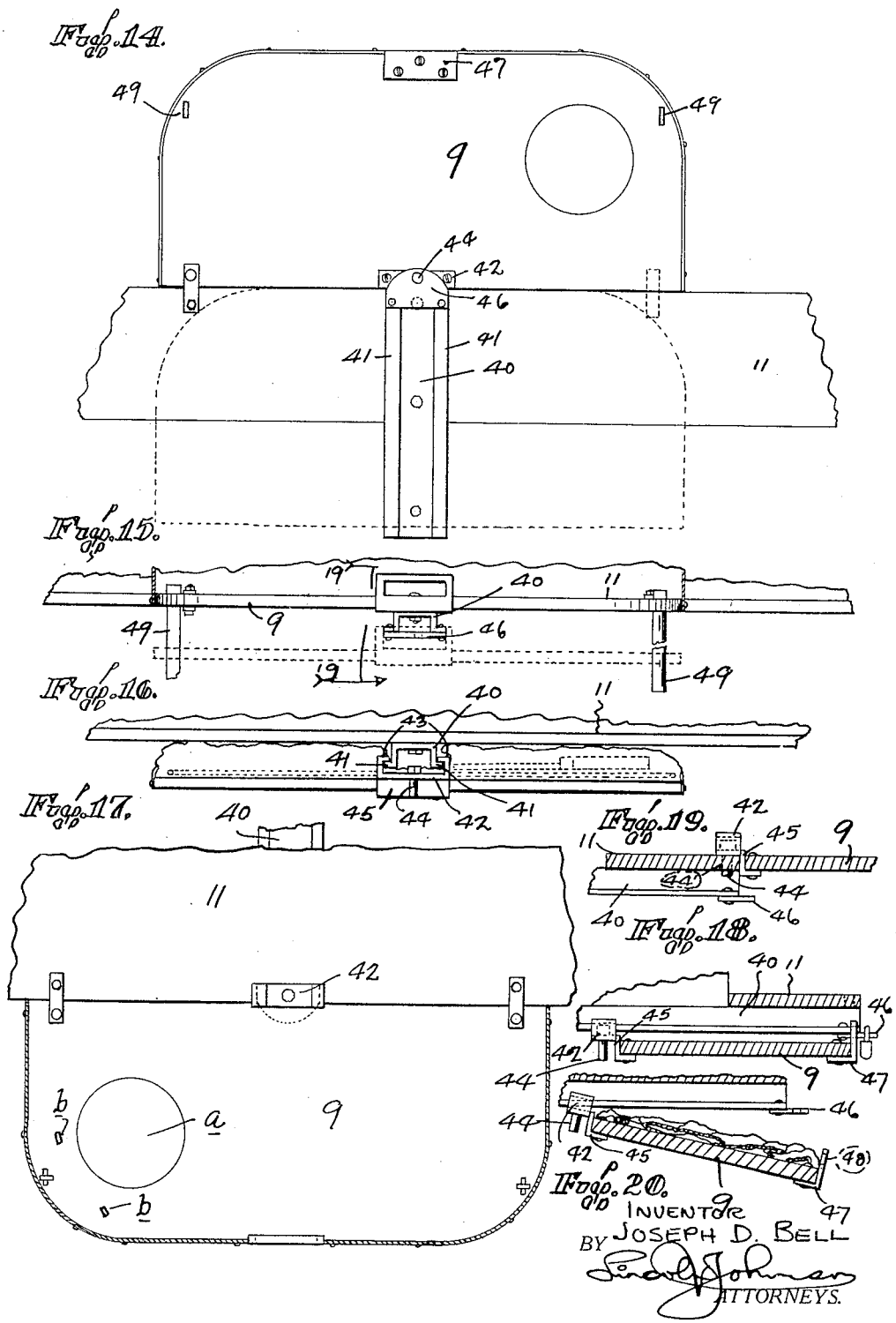

Patented Jan. 12, 1932

1,841,002

UNITED STATES PATENT OFFICE

JOSEPH D. BELL, OF SAN FRANCISCO, CALIFORNIA

DRESSING TENT FOR VEHICLES

Application filed October 10, 1927. Serial No. 225,373.

This invention relates to a dressing tent for vehicles, and in particular to a tent to be attached to the running board and to the body of a motor vehicle, and which may be stored, when not in use, in a compact form, beneath the running board of the vehicle, so that the same will not interfere with the operation of the vehicle or with the occupants thereof.

A still further object of the invention is to provide a dressing tent in which a person may dress, or perform other toilet operations with security, and with no danger of being viewed from the outside of the vehicle. My device is particularly adapted for attachment to vehicles of the sedan type, but it is contemplated that the invention may be attached to any vehicle.

Another object of the invention is to provide a device which is attached to the vehicle adjacent the vehicle door, or doors, and into which device the door or doors of the vehicle open, so that the occupants of the vehicle may readily enter the tent or return from the tent to the vehicle, without being exposed to view.

Another object of the invention is to provide a dressing tent which is highly useful and simple in construction. Convenience of arrangement, lightness, and comparative inexpensiveness of manufacture are other desirable features which have been borne in mind in the development of my invention.

In this specification and the annexed drawings, the invention is illustrated in the form considered to be best. It is to be understood that the invention is not limited to such forms, because it may be embodied in other forms, and it is also to be understood that in and by the claims following the description it is desired to cover the invention in whatever form it may be embodied.

In the accompanying four sheets of drawings

Fig. 1 is a front view of the invention, showing the same attached to the side of a motor vehicle, with certain parts of the device broken away to more clearly reveal the nature of the invention.

Fig. 2 is a top plan view showing the device attached to a vehicle as in Fig. 1.

Fig. 3 is a sectional view taken substantially along the line 3—3 of Fig. 1, in the direction of the arrows indicated.

Fig. 4 is a sectional view taken along the line 4—4 of Fig. 3.

Fig. 5 is a plan sectional view showing the floor of my dressing tent extended for use and showing the tent structure attached thereto.

Fig. 6 is a sectional view taken substantially along the line 6—6 of Fig. 5.

Fig. 7 is a fragmentary detail view, partly in section, showing the manner in which the tent stays are attached to the hinges of the motor vehicle doors.

Fig. 8 is a front elevation of a pair of the door hinges showing a tent stay mounted thereon.

Fig. 9 is a sectional view showing the manner in which a modified form of the tent floor constructed in accordance with my invention is extended for use.

Fig. 10 is a perspective view showing a sanitary receptacle that may be attached to the tent floor.

Fig. 11 is a perspective view of a portable wash basin used in connection with my invention.

Fig. 12 is a sectional view taken through the running board of an automobile vehicle showing a modified form of my invention attached thereto.

Fig. 13 is a perspective view showing the manner in which the tent supporting rods are attached to the vehicle.

Fig. 14 is a bottom plan view showing the preferred form of my invention, and showing the floor boards of the tent attached to the running board of an automobile in extended position.

Fig. 15 is a fragmentary side view of the running board extension, showing the manner in which same is attached to the vehicle running board.

Fig. 16 is a fragmentary side view of the running board extension, showing same stored away beneath the running board of the vehicle.

Fig. 17 is a plan sectional view of the preferred form of my invention, taken above the running board, showing the floor of the dressing tent in position extended for use.

Fig. 18 is a cross sectional view taken through the running board of a motor vehicle showing my device occupying a position beneath the same when stored away.

Fig. 19 is a fragmentary cross section taken substantially along the lines 19—19 of Fig. 15.

Fig. 20 is a cross sectional view taken through the running board, showing my tent collapsed and occupying the position which it will assume in the stored position.

Fig. 21 is a detail view of a hinge prop.

In the above mentioned drawings, similar characters of reference designate similar parts throughout, and the motor vehicle 10 shown in dotted lines has a body 12, in which there is a passenger compartment 13 and top 14 and a running board 11 along the side of the body. The body is provided with a pair of doors 15 and 16 that are attached thereto by means of the hinges 17 and 18 shown in Figs. 7 and 8. These hinges comprise staggered eyelets 19 having a pintle pin 20 extended therethrough, which pintle is provided with a head 21. The head is drilled to provide a socket 22. A set screw 22' extends through the head to the interior of the socket 22 and a U-shaped rod 23 formed of heavy wire or the like has its free ends extended into the sockets of each hinge as clearly seen in Fig. 1, so as to form an outward and horizontally disposed bow across the doors of the vehicle.

Secured to the top of the vehicle in alignment with the hinges on each door, are a pair of U-shaped brackets 24 that have parallel flanges 25 and 26, with aligned, squared apertures therethrough. A pair of U-shaped supports 27, each of which has a squared arm 28, extends through these squared apertures, as shown in Fig. 13. The free ends of each of these U-shaped supports have sockets 29—29' therein into which the free ends of bow rods 30 and 31 are to be received. The mediate portions of the two upper bowed rods 30 and 31 are supported by a hinged prop 32 which has notches 33—34 in the upper end to be inserted beneath the upper bow members 31 and 30 respectively, and has its other end resting on the running board extension of the vehicle. The notch 34 is formed in the hinge prop 32 at the proper height to maintain the bows 30 and 31 in spaced relation.

The tent wall is formed of any suitable fabric such as canvas and has a rod retaining strip 35 along its upper marginal edge to receive the upper bowed member 31 and a transverse rod retaining strip 36 runs across the fabric below the upper edge to receive the lower bow 30, the tent being suspended in a vertical position from the bow rods 30 and 31. The conventional type of tent flap 37 is formed along one side of the tent wall adjacent the vehicle body by providing an overlapping joint in the material extended to a point below the top of the tent wall.

The floor of the dressing tent is comprised partly by the running board of the vehicle and partly by an extension attached to an edge of the running board.

In the preferred form of the invention, an elongated track 40, U-shaped in cross section, is attached to the under side of the running board 11 and extends transversely thereacross, centrally relative to the tent structure. This U-shaped track 40 has lateral flanges 41 that extend outwardly from opposite sides thereof, at right angles to the edge of the running board. A slidable U-shaped bracket 42 that has inwardly extending flanges 43 on opposite sides thereof is adapted to be received on the opposite flanges 41 on the track 40. The bracket 42 has a pin 44 that extends downwardly from the bottom thereof and also has a depending angle bracket 45 that is bolted to the tent floor 9. The outer end of the track 40 has secured thereto as by riveting, bolting or the like, a hasp 46 and an angle piece 47 secured to the outer end of the running board extension 9 has a slot 48 therein that fits over the hasp. A suitable padlock, or the like, may be inserted through an aperture in the hasp, as shown in Fig. 18, to hold the floor locked beneath the running board. The floor 9 is adapted to receive the folded tent assembly to be locked beneath the running board when the tent is not in use.

When in use, the pin 44 is receivable within a socket 44' in the floor of the running board 11, and the extension or floor 9 lies flush with the running board. Suitable supporting means 49 are provided for the outer end of the running board extension 9, that comprises a removable prop or leg that supports the extension 9 from the ground, as disclosed in Fig. 15. It is preferable to have the lower end of the fabric tent wall permanently attached to the outer edge of the running board extension 9, and a portion of the fabric adjacent the existing flap being free to permit entrance into the tent.

In the form of the invention shown in Fig. 12, the running board extension or tent floor is formed of two sections, 10' and 11', hinged together at 12', the section 10' being permanently hinged to the permanent running board 11 and this hinge 12' is so arranged that the section 10' may swing inwardly, to occupy the position shown in dotted lines in Fig. 12. The section 11' is hinged to the section 10' so that two sections may be folded upon each other and swing inwardly under the running board. A suitable eyelet 13' is attached to the section 10' adjacent the running board 11, and a hook 14' or the like is attached to the under side of the running board 11 to engage the eyelet 13' to hold the folded sections in position under the running board, when not in use. In this particular form of the invention, it is preferable to have the lower edge of the fabric removably attached by snap fasteners 15' or the like, to the outer edge of the section 11'.

In the modification shown in Figs. 5 and 6, the running board extension 9" is pivoted at 10" to an end of a pair of swinging links 8". Each link 8" has an upset portion which is pivoted at 11" to the running board 11. The extension 9" has a marginal flange 12" to which the tent fabric is removably attached by means of suitable springs fasteners 14" in the tent material that engage apertures 15" in the marginal flange 12" to the eyelets 16" in the tent fabric to lighten the fabric and hold the same in position. When not in use the extension with the collapsed tent thereon may be swung underneath the running board, so as to occupy the position shown in dotted lines in Fig. 5. It is to be noted that in the last two forms of the invention described, the running board extension does not lie flush with the running board, and hence these are not preferred forms.

Various accessories and conveniences may be provided for, within the dressing tent. In Fig. 10 I have shown a convenience lavatory. A suitable circular section (a) is cut through the running board 9 and slots (b) in the running board are adapted to receive the ends of support rods (c). The rods (c) have secured to the upper end thereof a circular band (d). A supply of flexible cardboard or "congoleum" or the like may be carried in the vehicle and when desired this material may be rolled into the form of a cylinder (e) and inserted within the metal band (d) so as to enclose the section cut out in the running board.

In Fig. 11 a netting is shown as being stretched across the top of the band d and a paper (f) which may be of any nature such as wrapping paper or newspaper is placed on the netting. This forms a wash basin and when the user is through with the same he may punch an aperture (g) in the paper with his finger to drain off the water.

Although a preferred form and two specific modifications of the invention are herein shown, it is to be understood that no attempt has been made to show all the forms which might be used to advantage and it will be further understood that the details of construction may be altered without departing from the spirit of the invention as defined in the following claims.

Having thus described this invention, what I claim and desire to secure by Letters Patent is:

1. The combination with a vehicle body having a running board thereon of an extension for said running board; means for removably attaching said extension to said running board so as to lie in the same plane therewith; a removable tent structure attached to the vehicle side and enclosing a portion of the same to form a compartment on said body portion and extended above the top of the vehicle, said running board and extension forming the floor of said tent structure.

2. The combination with a vehicle body having a running board thereon, of a plurality of overlying bowed members having their free ends attached to the side of the vehicle body and overlying said running board; a tent fabric stretched around said bowed members to enclose a portion of the running board and vehicle side, said running board forming the floor of said tent structure.

3. The combination with a vehicle body having a running board thereon of a plurality of bowed members arranged in superimposed relationship having their free ends attached to said vehicle body, one of said bowed members being positioned above said vehicle body; a tent fabric stretched around said bowed members, to enclose a portion of the vehicle side and running board and an extension to said running board lying substantially flush therewith, said extension and running board forming the floor of said tent structure.

4. In combination with a vehicle body, having a running board thereon, of an extension piece to be arranged adjacent the outer edge of said running board to form a continuation thereof; a tent structure to be attached to the running board and extension; and rods detachably engaged with the vehicle side and projected outwardly therefrom over the running board and extension to hold the tent structure in erected position thereover.

5. In combination with a vehicle body, having a running board thereon, of an extension piece to be arranged adjacent the outer edge of said running board to form a continuation thereof; a tent structure to be attached to the running board and extension; rods detachably engaged with the vehicle side and projected outwardly therefrom over the running board and extension to hold the tent structure in erected position thereover; and collapsible means on the underside of the running board to support said extension in operative and in inoperative positions.

6. The combination with a vehicle body having a running board thereon, of an extensible floor mounted on the running board; and a removable tent structure attached to the body above the said floor and said running board enclosing a compartment with a portion of the vehicle side.

7. The combination with a vehicle body having a running board thereon, of an extension floor mounted on the running board; a tent structure on the extension floor and above a portion of the running board to form an enclosure at a portion of the vehicle side; and detachable means attached to the vehicle body to support the tent structure above said extension floor and said running board so that said tent structure extends above the vehicle top.

In testimony whereof, I have hereunto set my hand at San Francisco, California, this 29 day of August, 1927.

JOSEPH D. BELL.